United States Patent Office.

WILLIAM S. DE ZENG, OF GENEVA, NEW YORK.

Letters Patent No. 70,671, dated November 5, 1867.

---

IMPROVEMENT IN THE PREPARATION OF FERTILIZERS.

---

The Schedule referred to in these Letters Patent and making part of the same.

---

Be it known that I, WILLIAM S. DE ZENG, of the village of Geneva, in the county of Ontario, and State of New York, have invented a new and useful Improvement in the Process of Utilizing the Refuse Slags of Iron and other Smelting-Furnaces designed for the working of metals; and I do hereby declare that the following is a full, clear, and exact description.

In the manufacture of iron and other metals from their ores, a great quantity of mineral residuum is produced, termed slag. Large masses of this material now remain unappropriated to any useful purpose. Recent experiments have established the fact that slag contains such proportions of silica and lime as are required for compounding a mineral manure of the best character. In making mineral manure, the ingredients require to be finely pulverized, in order to adapt them to a more ready assimilation, and on the other hand for dissolving certain atmospheric constituents, such as ammonia, moisture, &c. Slag, if properly treated, can be more finely pulverized, and with greater economy, than any other known mineral compound. Hence it is desirable that the agricultural interests of the country should be benefited by the utilization of slags for this purpose.

My invention consists in taking slag in its most favorable condition, and reducing it to powder by the best means available, and subsequently mixing it with any waste material containing alkalies or acids, and also poudrettes of various kinds, for the purpose of adapting it as a manure to different qualities of soil.

In order that any one not skilled in the art may be enabled to use my said invention, I will proceed to describe more particularly the process which I have practised with success.

I prefer using slag as it is ejected from the furnace. In its then hot liquid state a stream of cold water is made to pass over it, or the liquid mass itself is plunged into a reservoir of cold water, which has the effect of rendering it brittle, on account of the sudden chilling of the particles, thereby facilitating its reduction to a fine powder. The slag thus rendered friable is then pulverized by suitable machinery. I also reduce cold slag to powder by machinery, although at more expense and trouble than by the former mode.

This pulverized slag presents principally a silicate of lime and alumina with iron, &c., which can be advantageously used as a fertilizer or manure upon all soils appropriated to the culture of cereal products, and can be supplied cheaply and in large quantities for this purpose.

Again, my invention consists in a second preparation of slag, involving additional expense in manufacturing. For making this variety of slag manure, I employ acids and alkalies, usually the waste acids of printing, coloring, and dyeing manufactories, and such alkalies as can be most cheaply provided. In applying acids and alkalies to or mixing them with pulverized slag, the kind and quantites of acids and alkalies used must be determined both by the ingredients contained in the slag and the nature of the soil for which the fertilizing compound is intended. In some slags silica greatly predominates. When this variety is intended for grain-growing soils, I add sulphuric acid thereto, which forms sulphate of lime or gypsum, which is highly useful in retaining volatile alkali or ammonia, and sets free a large amount of silica, which is needed in the growth of grain. If the slag contains an excess of silica, and is designed for silicious soils, I add less acid and larger quantities of alkalies.

Again, my invention consists in a third preparation of slag, viz, the mixture of the two previous preparations (that is, of pure pulverized slag, or of slag chemically treated by the mixture of acids and alkalies) with poudrette, urine, farm-house manure, or any other cheap material containing ammonia, phosphates, &c. There are certain soils which require large quantities of ammonia, and there is no better method of supplying it than in combination with the finely-pulverized mineral ingredients afforded by the previously-described preparations of slag, which exhibit absorptive powers in a very high degree.

What I claim as my invention, and desire to secure by Letters Patent, is—

The application of slags of reducing and smelting-furnaces as a fertilizer, using the slags and adapting them for this purpose, substantially as described in the above specification, viz, in a finely-pulverized condition, also in combination with acids and alkalies, and also in intimate admixture with certain ammoniacal compounds, above specified.

WM. S. DE ZENG.

Witnesses:
GEO. F. SEWARD,
ROBERT ROSE.